United States Patent [19]

Bowden et al.

[11] 4,321,314

[45] Mar. 23, 1982

[54] NON-AQUEOUS CELL SAFETY

[75] Inventors: William L. Bowden, Nashua; Peter R. Moses, Windham, both of N.H.

[73] Assignee: Duracell International Inc., Bethel, Conn.

[21] Appl. No.: 182,897

[22] Filed: Sep. 2, 1980

[51] Int. Cl.³ .......................................... H01M 10/44
[52] U.S. Cl. ...................................... 429/50; 429/197
[58] Field of Search ........................ 429/50, 194, 197; 29/623.1

[56] References Cited

U.S. PATENT DOCUMENTS 4,129,691 12/1978 Broussely ............................ 429/197

*Primary Examiner*—Charles F. LeFevour
*Attorney, Agent, or Firm*—Ronald S. Cornell; Israel Nissenbaum

[57] ABSTRACT

The safety of a cell such as a $Li/MnO_2$ cell is improved by complexing the volatile electrolyte solvent normally used therein with the electrolyte salt whereby efficient solvation of the salt is obtained without detrimental free volatile solvent.

15 Claims, No Drawings

NON-AQUEOUS CELL SAFETY

This invention relates to electrolyte salts and solvents utilized in non-aqueous electrochemical cells, particularly the salts and solvents commonly utilized in Li/MnO₂ cells.

Commercially produced Li/MnO₂ cells contain a lithium perchlorate salt dissolved in a 1:1 volume mixture of propylene carbonate (PC) and dimethoxyethane (DME) as electrolyte solvent. The propylene carbonate has a high dielectric strength and provides highly conducting solutions. Dimethoxyethane serves to lower the electrolyte viscosity, particularly at lower temperatures and aids in solvation of ions in the solution. However dimethoxyethane has the disadvantage, because of its volatility, of presenting a fire hazard as well as the possibility of changing composition of the electrolyte solution by evaporation thereof. Utilization of pure propylene carbonate as an alternative is undesirable because of resultant very poor low temperature performance.

It is an object of the present invention to provide a means whereby volatile electrolyte solvents may be utilized but without their ill effects in an electrochemical cell.

In co-pending application Ser. No. 182,902, filed Sept. 2, 1980, there is disclosed a complexed or coordinated metal salt such as lithium perchlorate with an ether such as dimethoxyethane. The complexed lithium salt was found to be useful particularly in SO₂ cells and rechargeable cells since it eliminated the need for organic cosolvents normally used to aid in the solvation of metal salts. It has been further discovered that such complexing of metal salts enables cells, which normally must contain volatile ethers such as dimethoxyethane for solvation purposes, to be made safer without significant detrimental effect.

Generally the present invention comprises the pre-complexing of a volatile electrolyte solvent with a metal salt whereby the metal in the salt is coordinated in stoichiometric relation to the volatile solvent such that the cell containing the complexed or coordinated salt is substantially free of the uncomplexed free volatile solvent and wherein solvation of the electrolyte salt and cell performance is not significantly effected thereby.

For example, in accordance with the present invention, the lithium perchlorate salt commonly utilized in Li/MnO₂ cells is coordinated to a stoichiometric amount of dimethoxyethane by dissolving the perchlorate in dimethoxyethane and removing and drying the white precipitate which forms after the solution has cooled. The precipitate comprises the coordinated salt and is soluble in the propylene carbonate solvent commonly used in the Li/MnO₂ cells. It is believed that two dimethoxyethane molecules are coordinated with each lithium ion:

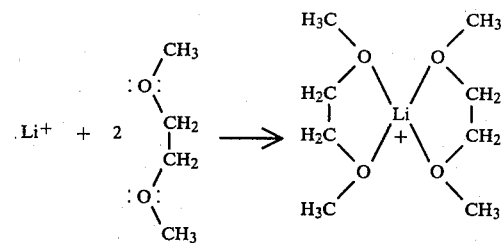

The stoichiometric formula for the coordinated lithium perchlorate with dimethoxyethane is therefore Li(DME)₂ClO₄. By complexing the volatile ether as well as other volatile substances which complex with the metal salts, the cell is substantially free of free ethers and the fire hazard is reduced. Furthermore, there is no problem of solvent evaporation. In addition to the aforementioned perchlorate, other salts which may be usefully complexed with volatile solvents include alkali and alkaline earth metal salts having $PF_6^-$, $AsF_6^-$, $CF_3SO_3^-$, $C_6H_5SO_3^-$, $CH_3C_6H_4SO_3^-$, $NO_3^-$ anions as well as bromides, chlorides, iodides, perchlorates and other commonly utilized electrolyte salts. Since it is the metal cation which is complexed, the anion of the salt is generally not determinative of any complexing behavior. Because of its high affinity for complexing as well as the fact that lithium anode cells provide the highest energy density, it is preferred that the complexed salts contain lithium cations. However, complexed alkali and alkaline earth metal salts having cations other than lithium are similarly within the scope of the present invention. Such alkali and alkaline earth metals also comprise the anodes utilized in the cells of the present invention.

The volatile solvents must be able to tightly complex with the metal salt cations in order to prevent free solvent from remaining in the cell. Solvents which are both volatile and capable of complexing with the metal salt cations include ethers such as the aforementioned dimethoxyethane; 1,4 dioxane; 1,3 dioxlane; tetrahydrofuran; diglyme and triglyme. Of the aforementioned ethers, dimethoxyethane is the most preferred because of its ability, dictated by its structural configuration, to very strongly complex with the metal salts and to therefore provide very stable molecular complexes.

Since the volatile solvent is present in the cell substantially only in the complexed form with the electrolyte salt, at least one second solvent is required within the cell. The second solvent must be capable of solvating the complex salt in order to provide adequate ionic conductivity. Thus, the propylene carbonate used in Li/MnO₂ cells is such a second solvent and in fact easily solvates the complex salt such as Li(DME)₂ClO₄.

In order to further improve low temperature cell performance in cells having the complexed salt such as Li(DME)₂ClO₄ a less volatile solvent (relative to DME) such as diglyme having a low viscosity may further be added. The low viscosity solvent need not provide any increase in conductivity but should merely maintain a less viscous operating solvent such as PC at the lower temperatures.

In order to more fully illustrate the efficacy of the present invention the following examples are presented. I should be understood however that such examples are for illustrative purposes only and that any enumeration of detail contained therein should not be construed as limitations on the present invention. Unless otherwise indicated all parts are parts by weight.

EXAMPLE 1 (PRIOR ART)

A flat button cell (0.1" height by 1" diameter) is constructed containing a lithium foil disk weighing about 70 mg, a non-woven polypropylene disk separator and a cathode disk pressed from 1 gram of a mixture of 90% beta $MnO_2$, 6% graphite and 4% Teflon powder. The electrolyte is about 275 mg of a 1M $LiClO_4$ in a 1:1 equivolume mixture propylene carbonate-dimethoxyethane solution. The cell is discharged with a load of 5 K$\omega$ at room temperature and provides about 225 mAhr to a 2.0 volt cutoff.

EXAMPLE 2 (PRIOR ART)

A cell is made in accordance with Example 1 and discharged with a load of 5 K$\omega$ at $-20°$ C. and provides about 150 mAhr to a 2.0 volt cutoff.

EXAMPLE 3 (MODIFIED PRIOR ART)

A cell is made in accordance with Example 1 but with an electrolyte solution of 1 M $LiClO_4$ is propylene carbonate. The cell is discharged as above at $-20°$ C. and provides about 102 mAhr to a 2.0 volt cutoff.

EXAMPLE 4

A cell is made in accordance with Example 1 but with an electrolyte solution of 1 M $Li(DME)_2ClO_4$ in propylene carbonate. The cell is discharged as above at room temperature and provides about 227 mAhr to a 2.0 volt cutoff.

EXAMPLE 5

A cell is made in accordance with Example 4 and is discharged similarly but at $-20°$ C. The cell provides about 149 mAhr to a 2.0 volt cutoff.

It is evident from the above examples that removal of the dimethoxyethane solvent from the cell leaving only a PC solvent provides a cell having considerably reduced capacity at the low $-20°$ C. temperature, whereas utilization of the complexed salt of the present invention in place of the free DME and perchlorate provides cells having similar room and low temperature performance characteristics relative to the prior art cells having free dimethoxyethane therein. Thus safety is enhanced in the cells of the present invention with the utilization of the complexed salts (and the elimination of free volatile solvent) but without significant penalty in the form of reduced capacity at lower temperatures.

It is understood that the above examples are illustrative in nature and should not be considered as limitations on the present invention. It is further understood that changes may be made in cell structure and components without departing from the scope of the present invention as defined in the following claims.

What is claimed is:

1. A method for improving the safety of a nonaqueous electrochemical cell containing an electrolyte system comprising an alkali or alkaline earth metal electrolyte salt, a normally volatile solvent and a second solvent, said method comprising the steps of forming a stoichiometric complex of said salt and said volatile solvent and adding said normally volatile solvent to said cell substantially only in said complexed form by solvation thereof within said second solvent, whereby said cell is substantially free of uncomplexed normally volatile solvent.

2. The method of claim 1 wherein said volatile solvent is an ether.

3. The method of claim 2 wherein said ether is selected from the group consisting of dimethoxyethane; 1, 4 dioxane; 1, 3 dioxolane; tetrahydrofuran; diglyme and triglyme.

4. The method of claim 3 wherein said ether is dimethoxyethane.

5. The method of claim 4 wherein said electrolyte salt is selected from the group consisting of alkali and alkaline earth metal salts having $PF_6^-$, $AsF_6^-$, $CF_3SO_3^-$, $CH_3C_6H_4SO_3^-$, $NO_3^-$, bromide, chloride, iodide and perchlorate anions.

6. The method of claim 5 wherein said electrolyte salt is lithium perchlorate.

7. The method of claim 6 wherein said electrochemical cell contains a lithium anode.

8. The method of claim 4 wherein said second solvent comprises propylene carbonate.

9. A cell having improved safety and made in accordance with the method of claim 1.

10. A method for improving the safety of an electrochemical cell comprising a lithium anode, a manganese dioxide cathode depolarizer and an electrolyte system containing a lithium metal salt, dimethoxyethane and an electrolyte salt solvent said method comprising the step of adding said dimethoxyethane, substantially only in the form of a stoichiometric complex with said metal salt to said cell, by solvating said complex in said electrolyte salt solvent whereby said cell is substantially free of uncomplexed dimethoxyethane.

11. The method of claim 10 wherein said electrolyte salt solvent comprises propylene carbonate.

12. The method of claim 11 wherein said electrolyte salt solvent further contains a solvent having lower viscosity than said propylene carbonate at low temperatures.

13. The method of claim 11 wherein said electrolyte salt is selected from the group consisting of lithium salts having $PF_6^-$, $AsF_6^-$, $CF_3SO_3^-$, $CH_3C_6H_4SO_3^-$, $NO_3^-$, bromide, chloride, iodide and perchlorate anions.

14. The method of claim 13 wherein said lithium salts is lithium perchlorate.

15. A cell having improved safety and made in accordance with the method of claim 11.

* * * * *